US010762189B2

(12) United States Patent
Wynen et al.

(10) Patent No.: US 10,762,189 B2
(45) Date of Patent: Sep. 1, 2020

(54) SEGMENT PATTERN ENTRY BASED AUTHENTICATION

(71) Applicant: BlackBerry Limited, Waterloo (CA)

(72) Inventors: John William Wynen, Conestogo (CA); Michael Certain, Brantford (CA)

(73) Assignee: BlackBerry Limited, Waterloo, Ontario (CA)

(*) Notice: Subject to any disclaimer, the term of this patent is extended or adjusted under 35 U.S.C. 154(b) by 239 days.

(21) Appl. No.: 14/746,181

(22) Filed: Jun. 22, 2015

(65) Prior Publication Data

US 2016/0371479 A1    Dec. 22, 2016

(51) Int. Cl.
| | |
|---|---|
| H04L 29/06 | (2006.01) |
| G06F 21/36 | (2013.01) |
| H04W 12/06 | (2009.01) |
| H04W 12/00 | (2009.01) |
| G06F 3/0488 | (2013.01) |
| H04W 88/02 | (2009.01) |

(52) U.S. Cl.
CPC ............ *G06F 21/36* (2013.01); *G06F 3/0488* (2013.01); *H04L 63/083* (2013.01); *H04W 12/003* (2019.01); *H04W 12/06* (2013.01); *H04W 88/02* (2013.01)

(58) Field of Classification Search
CPC ................................... G06F 9/00; H04L 12/00
See application file for complete search history.

(56) References Cited

U.S. PATENT DOCUMENTS

| | | | |
|---|---|---|---|
| 5,465,084 | A | 11/1995 | Cottrell |
| 7,552,467 | B2 | 6/2009 | Lindsay |
| 7,877,612 | B2 | 1/2011 | McKeeth |
| (Continued) | | | |

FOREIGN PATENT DOCUMENTS

| | | |
|---|---|---|
| EP | 2487620 | 8/2012 |
| EP | 2509019 | 10/2012 |
| (Continued) | | |

OTHER PUBLICATIONS

Extended European Search Report dated Mar. 30, 2017, received for European Application No. 16174841.3.

(Continued)

*Primary Examiner* — Joseph P Hirl
*Assistant Examiner* — Leynna Truvan
(74) *Attorney, Agent, or Firm* — Jeffrey N. Giunta; Fleit Intellectual Property Law

(57) ABSTRACT

A system and method to support authentication or device pairing. A respective indication is received from a respective output of each respective contact element within a plurality of contact elements. The respective output indicates a touching of the respective contact element. Based on receiving the respective indication, a respective state associated with the respective contact element is changed. The respective contact element is controlled to change its respective visual state to correspond to its respective state. Based on receipt of the respective indication, it is determined whether the respective states of the plurality of contact elements match a determined pattern. Based on a determination that the respective states of the plurality of contact elements match the determined pattern, access to an operation is authorized.

19 Claims, 8 Drawing Sheets

(56) References Cited

U.S. PATENT DOCUMENTS

| | | |
|---|---|---|
| 8,112,632 B2 | 2/2012 | Bedingfield, Sr. |
| 8,789,206 B2 | 7/2014 | Harris |
| 8,949,934 B2 | 2/2015 | Wang et al. |
| 8,963,869 B2 | 2/2015 | Hicks et al. |
| 2005/0038756 A1* | 2/2005 | Nagel ................. G06K 19/086 705/76 |
| 2009/0037986 A1 | 2/2009 | Baker |
| 2009/0298469 A1* | 12/2009 | Kim ................. H04M 1/72522 455/411 |
| 2013/0065517 A1 | 3/2013 | Svensson et al. |
| 2014/0099924 A1 | 4/2014 | Kim et al. |
| 2014/0137049 A1 | 5/2014 | Jung et al. |
| 2014/0165186 A1 | 6/2014 | Ramu |

FOREIGN PATENT DOCUMENTS

| | | |
|---|---|---|
| JP | 2012181716 | 9/2012 |
| KR | 101302367 | 9/2013 |

OTHER PUBLICATIONS

Communication under Rule 71(3) EPC for European App. No. 16174841.3 dated Feb. 25, 2019.

\* cited by examiner

SEGMENT PATTERN ENTRY BASED AUTHENTICATION

FIELD OF THE DISCLOSURE

The present disclosure generally relates to authenticating a user's entry or to device pairing, and more particularly to processing to authenticate an entity or pairing devices based on pattern entry.

BACKGROUND

Users of electronic devices authenticate themselves, or identify that that they are at least an authorized user of a device, by different techniques. Often, a user provides authentication by entering a password, alpha-numeric code, or other alpha-numeric based input through use of a keyboard or other numeric or alphanumeric input device. Some authentication is alternatively performed by having a user trace a particular pattern on a touch sensitive display, such as connecting a sequence of dots on a touch sensitive display in a particular pattern. These authentication techniques are based on the historic assumption that authentication is only used with devices that have more complex user interface components.

Electronic devices that do not have conventional user interface components are being developed that would nonethe-less benefit from allowing user authentication. Such devices that do not have conventional user interface components are able to, for example, perform electronic communication with other devices and a user's explicit authentication, or entering information such as a pairing code provided by the other device, with the device ensures the other devices are communicating with the intended device. Devices without conventional user interfaces sometimes employ a fixed authentication code that a user enters on other devices to "pair" the two devices. Such simple fixed authentication code techniques are more susceptible to misuse or harmful exploitation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
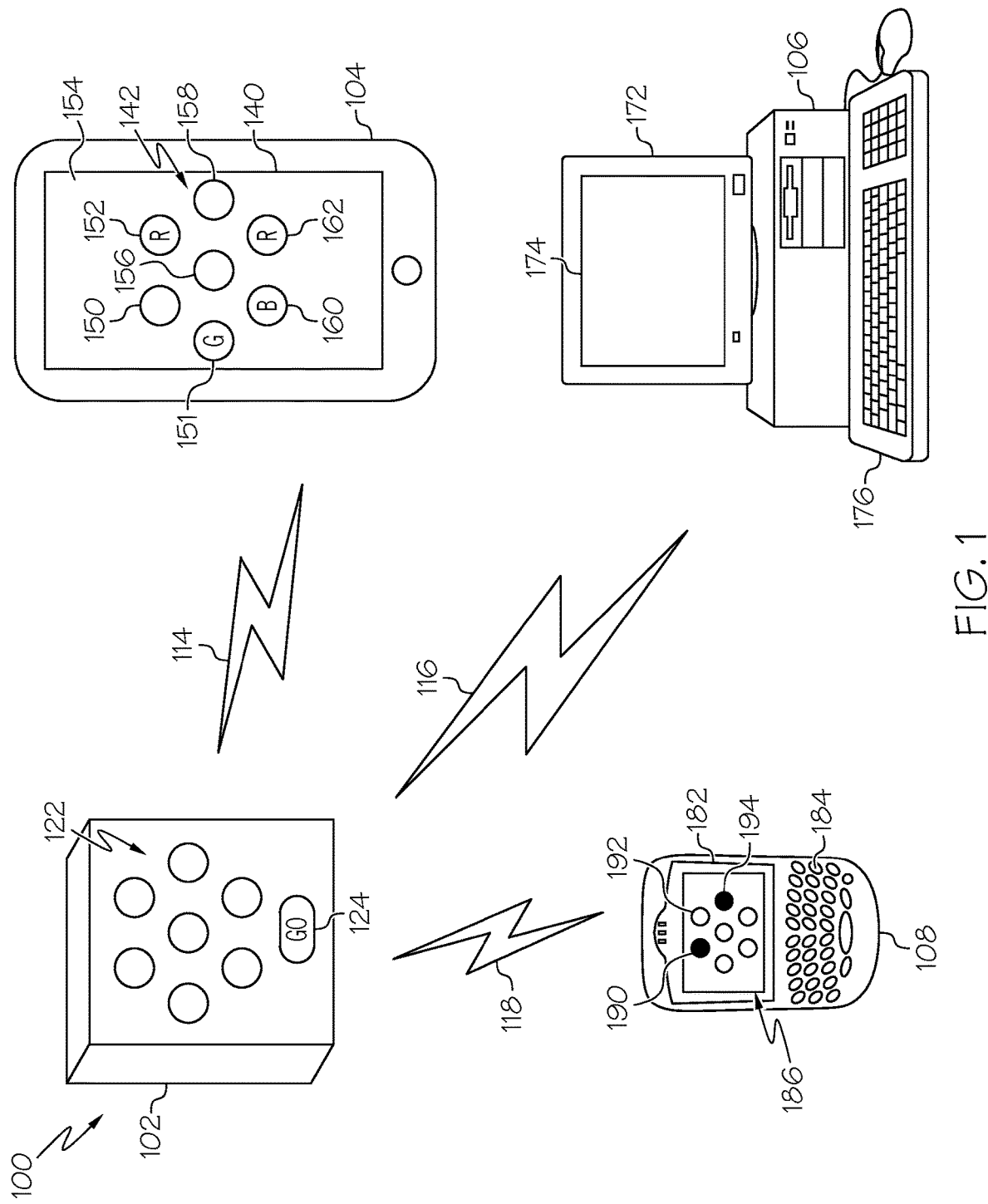
FIG. 1 illustrates a device paring environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, designed and otherwise configured to be carried and operated while being held in a human hand or hands.

The below described systems and methods support authentication on devices that do not have a conventional user interface. In an example, a device has a pattern on its surface that is made up of a number of separately illuminated segments that forms an arrangement of segments. Each segment of the arrangement or pattern in one example is able to be illuminated by a light that is able to change colors or be turned off. For example, each segment is able to be transparent or translucent and a light source placed behind the segment is able to pass light through the segment so the particular color light emitted by that light source is carried through the segment and that segment appears to be that color to a viewer from the outside of the device.

In an example, each segment may be able to be illuminated by a light source that is able to change between being off, emitting a blue light, emitting green light, and emitting red light. In further examples, any number of colors as well as any value of those colors is able to be used. Each of these different segments is able to individually detect when a user touches or presses on the segment, and in response to being touched or pressed, a controller detects the touch or press and controls the light source illuminating that segment to change color. In this manner, a user is able to touch or press the various segments and change their color so that all of the segments in the arrangement form a particular color pattern. In some examples, a user is able to change the color of each segment in the arrangement of segments so that the segments form a color pattern that matches a defined pattern. When the device determines the color of the segments have been arranged according to the defined pattern, the device is able to determine authentication, authorization, or be able to condition performing other actions based upon a determination that the color pattern set by the user matches the defined color pattern. The defined color pattern that is to be matched by setting segments in the arrangement of segments is able to be defined according to any relevant criteria. As is described in further detail below, in one example the defined pattern is able to be based on a pairing code that allows the device to be paired with another device to establish a trusted communications channel. In another example, the defined pattern is able to be based on a user entered color pattern whereby the user is able to set that same pattern on the arrangement segments in order to access functions on the device.

In the following description, the terms "pressing" and "touching" with reference to user interactions with segments of an arrangement of segments are intended to be used interchangeably. In some examples, each segment within an arrangement of segments has a mechanical switch that changes state when a user mechanically presses a segment element to depress the segment element into the device and mechanically change the state of the switch. In further examples, each segment element is configured to respond to mere touches of the segment element and no mechanical movement is required. Examples of such segments are segments that have a conductive coating and detect capacitive or ohmic coupling between the segment and a user's finger or other device merely touching the segment. As such, the action of touching or pressing the segment are generally perceived as similar actions to a user and references to touching include, without limitation, an action of pressing the segment as well.

In an example, the segments are able to be arranged to form a logo or other symbol which is placed on the case of the device. In some examples, the device has few or no other user input facilities and entry of authentication information would be limited without the use of the pattern of segments as described above. It is generally desirable to have a logo placed on devices that is large enough to be noticed by casual observers. Reusing the space of a logo, particularly on a device with a small enclosure or perhaps a device that has only a small surface area that is normally visible to users, allows an effective user interface facility to be provided while also providing a logo on the scares space of a small enclosure. Aesthetic aspects are also able to be enhanced by the flexibility of providing a user interface facility that has an intuitive and unconventional configuration.

FIG. 1 illustrates a device paring environment 100, according to an example. The device paring environment 100 illustrates an electronic device 102 that is able to establish wireless communications with other devices. The device pairing environment 100 illustrates the electronic device 102 being in communications with a smartphone 108, a computer 106, and a tablet computing device 104. The illustrated example depicts the electronic device 102 in communications with the tablet computing device 104 over a first wireless link 114, in communications with the computer 106 over a second wireless link 116, and in communications with the smartphone 108 over a third wireless link 118. In an example, the other devices are able to establish a trusted connection over these respective wireless connections with the electronic device 102 based on a user entering a code into the electronic device 102. The entry of this code is sometimes used in conjunction with exchanging cryptographic certificates between the two devices as is known by practitioners of ordinary skill in the relevant arts. Examples of trusted relationships include a process known as pairing such as is performed under the Bluetooth® standard, or in establishing a BlackBerry® Blend™ connection.

The electronic device 102 in the illustrated example is a device that does not have a conventional user interface, but does have an arrangement of segments 122 and may further include a single input button 124. The input button 124 is labeled "GO" in this example but in examples that include an input button 124, that button is able to have various graphic representations, such as arrows or other non-lingual indicia, to represent its ability to cause an action to take place. The user input facilities and associated control circuits, as are described below, of the electronic device 102 are an example of a user code input device. In the illustrated example, a user is able to cause each segment in the arrangement of segments to have a selected color in order to set a pattern of colored light on the arrangement of segments 122. Pressing the input button 124 allows the pattern set by the user to be compared to a defined pattern. Based on the comparison indicating that the color pattern set on the arrangement of segments by the user matches the defined pattern, processing may be authorized to proceed such as by authorizing the execution of functions or applications on the electronic device 102, or by proceeding with pairing of the electronic device 102 and a remote device, such as the tablet computing device 104.

In the illustrated example, the arrangement of segments 122 is shown to consist of three rows of two or three segments each. In further examples, any number of segments may be included in the arrangement and those segments are able to be arranged in any configuration. In an example, each segment in the arrangement of segments is individually back-lit by a separately controllable, multiple color light source, such as a multi-color Light Emitting Diode (LED). As described below, a user is able to individually touch or press each segment and a controller within the electronic device 102 operates to change the color emitted by the light source associated with the pressed or touched segment so that the color emitted by the segment changes. In an example, a user is able to press each segment any number of times until the segment is illuminated with a desired color. The user is able to touch any segment in the arrangement of segments 122 to set a particular color pattern among all of the segments. Once the desired color pattern is set on the arrangement of segments 122, the user in one example is able to press the input button 124 to initiate a comparison of the pattern set on the arrangement of segments 122 to a defined pattern. In some examples, a determination that the pattern set on the arrangement of segments 122 matches the defined pattern authorizes particular processing functions on the electronic device 102 to proceed. For example, the color pattern set on the arrangement of segments 122 is able to correspond to a defined pattern used to authorize pairing the electronic device 102 with other devices or authorize functions or applications on the electronic device 102.

As is understood by practitioners of ordinary skill in the relevant arts, pairing of two devices is able to be used to establish a trusted communications connection between the devices. In the illustrated device pairing environment 100, trusted communications connections are able to be established between the electronic device 102 and another device over one of the depicted wireless communications links. For example, a trusted communications connection is able to be established between the electronic device 102 and the tablet computing device 104 over the first wireless link 114.

In pairing two devices, one of the devices is able to "search" for available devices with which to pair. After discovering available devices, a presentation is provided to the user to select one of the discovered available devices with which to perform pairing to establish a trusted communications connection. In order to confirm that the user wants to pair the selected available device and create the trusted communications connection, one device displays a code, such as a numeric sequence, to the user and the user then enters that same code on the other device to be paired. In some devices, this code related to values derived based on mathematical operations on or combinations of cryptographic keys or certificates exchanged between the devices to enhance the security of the trusted communications channel. In this scenario, the user acts as a trusted side channel to communicate the code from one device to another. In the case of devices without sufficient user interface facilities to support the display, entry, or both, of a code, a device is able to have a set code that is defined for the device. In that instance, the user obtains that set code by other means, such as from a device's user's manual, and enters the code into a device with suitable user input facilities.

In some examples, the arrangement of segments 122 on the electronic device 102 is used to enter a code to support pairing between the electronic device 102 and another remote device. In one example, the arrangement of segments 122 is used to support pairing of the electronic device 102 with the tablet computing device 104. In the illustrated example, the tablet computing device 104 has a display screen 140 that has a depiction of an arrangement of segments display 142 that corresponds to the arrangement of segments 122 on the electronic device 102. The arrangement of segments display 142 depicts some segments as not being illuminated, and other segments are illuminated in specific colors. In some examples, each of the segments that are depicted as being illuminated are shown with a particular color that can be generated by the back lighting of the segments of the arrangement of segments 122 on the electronic device 102.

The illustrated arrangement of segments display 142 depicted on the display screen 140 of the tablet computing device 104 consists of seven segments with three segments that are not illuminated, and four segments that are illuminated with a specified color. The first segment 150, fourth segment 156 and fifth segment 158 are shown as hollow circles, indicating that those segments are not illuminated. The second segment 152 is shown with an "R" in the circle, indicating that the second segment is shown as being "Red." In an example where the display screen 140 of the tablet computing device 104 supports displaying color images, the depicting an arrangement of segments display 142 is able to display a graphical symbol of the illuminated segments in the color associated with that segment. When depicting the arrangement of segments display 142 on a display screen that does not sufficiently depict different colors, letters, such as are shown in the illustrated arrangement of segments display 142, are able to be used.

Referring to the illustrated arrangement of segments display 142, the third segment 154 is shown with a "G" indicating that the segment is green. The sixth segment 160 is shown with a "B" indicating that the segment is blue and the seventh segment 162 is shown with an "R" indicating that the segment is Red. In this example, in order to perform pairing between the electronic device 102 and the tablet computing device 104, the tablet computing device 104 displays the arrangement of segments display 142 on its display screen 140, and the user sets that same color pattern on the arrangement of segments 122 on the electronic device 102 and presses the input button 124. A processor within the electronic device 102, based on pressing the input button 124, determines the color pattern set on the arrangement of segments 122. A determination is then made to compare the color pattern set on the arrangement of segments 122 with a determined pattern used to create the arrangement of segments display 142 and based on the patterns matching, paring is authorized and proceeds. In various examples, the comparison of color patterns is able to be performed by a processor within the electronic device 102, by a processor within the other device such as the tablet computing device 104 in the above example, by a processor in another device, or the comparison is able to be distributed among processors located within two or more devices. In some examples, the comparison may be based on data communicated between devices, such as data describing one or more of the color patterns set by a user on the electronic device 102, the determined color pattern displayed on the remote device, data upon which the determined color pattern is based (such as certificates or cryptographic keys), or combinations of these.

The device paring environment 100 further depicts a smartphone 108 with a display 182 and keypad 184. Various other configurations of smartphones or equivalent devices that have suitable user interface facilities to display information and receive user inputs are also able to be used in a manner similar to that described herein. The display 182 of the smartphone depicts a second arrangement of segments display 186 that has a different color arrangement than the arrangement of segments display 142 depicted by the tablet computing device 104. This demonstrates the independence of the trusted communications channel between the smartphone 108 and the electronic device 102 and the trusted communications channel between the electronic device 102 and electronic device 102 the tablet computing device 104.

In a manner similar to that described above, the smartphone 108 is able to search for nearby devices with which to pair, and the user is able to use the smartphone user interface facilities, such as display 182 and keypad 184, to select the electronic device 102 and cause the second arrangement of segments display 186 to be displayed. The user is then able to set the arrangement of segments 122 of the electronic device 102 to match the color pattern depicted by second arrangement of segments display 186 and establish a trusted communications connection over the third wireless link 118.

The device paring environment 100 further includes a computer 106 with an attached keyboard 176, monitor 172 with a monitor display screen 174. In some examples, the computer 106 is able to similarly display an arrangement of segments display such as is depicted by the tablet computing device 104 and smartphone 108. Upon setting a matching color pattern on the arrangement of segments 122, the electronic device 102 is able to be paired with the computer 106 and a trusted communication channel between the electronic device 102 and the computer 106 is able to be established over the second wireless link 116.

In some further examples, the electronic device 102 is also able to present a depiction of the determined pattern, and a user is able to use the user interface facilities to recreate that color pattern on a suitable display of another device. For example, the electronic device 102 is able to illuminate the segments within the arrangement of segments 122 with a particular color pattern. Once the arrangement of segments 122 is illuminated in this pattern, a user of a remote device, such as one or more of the tablet computing device 104, computer 106, smartphone 108, or combinations of these, is able to set a depiction of an arrangement of segments display on that device to support pairing with the electronic device 102. For example, tablet computing device 104 is able to have a display screen 140 that supports detecting user's touching of the screen such that the color of depicted segments within the arrangement of segments display 142 change when the user touches a segment. This allows the user of the tablet computing device 104 to set a color pattern that corresponds to that displayed by the electronic device 102 to support a pairing operation to establish a trusted communications link over the first wireless link 114. It is further clear that the color pattern of the arrangement of segments display 142 is able to alternatively be set on any device that has any suitable user input facilities for setting that defined color pattern. For example, a device that includes or does not include a touch display screen, that receives user inputs provided by a keyboard, trackball, receives other user inputs, receives user inputs operating in conjunction with displayed screen cursors, receives user inputs that select particular segments by various techniques, or combinations of any of these facilities, are able to be used to set a color pattern that can be compared to a defined color pattern. In some examples, this setting of a color pattern is performed after the electronic device 102 has been selected by a suitable technique by the user of the remote device for pairing with the remote device.

In addition to supporting pairing with a device that has limited user interface facilities, such as the electronic device 102, with other devices, the arrangement of segments 122 in some examples are able to be used to limit processing that is able to be performed by the electronic device 102. In an example, a user is able to set a particular color pattern on the arrangement of segments 122 to authenticate that user. Once the user performs this authentication, in an example, further functions of the electronic device 102 are able to be enabled. The definition of the color pattern used to authenticate the user is able to be defined by any suitable technique. For example, a user is able to "set" the defined color pattern in a configuration process on the electronic device 102 itself. Alternatively, for example, the color pattern may be defined by a remote device and a definition of the defined color pattern is able to be communicated the electronic device 102.

Although the above describes the segments being illuminated with different color light and the color of that light changing upon a touch or press of the respective segment, further examples are able to operate with monochrome light or by other techniques to change a visual state of the segment. For example, a light source that backlights a particular segment may toggle between being on an off when a user touches or presses the segment. In further examples, mechanical shutters may switch between two or among more states to change a visual state of the segment, such as changing a color of the segment, blocking light passing through the segment, etc.

Figure 2:
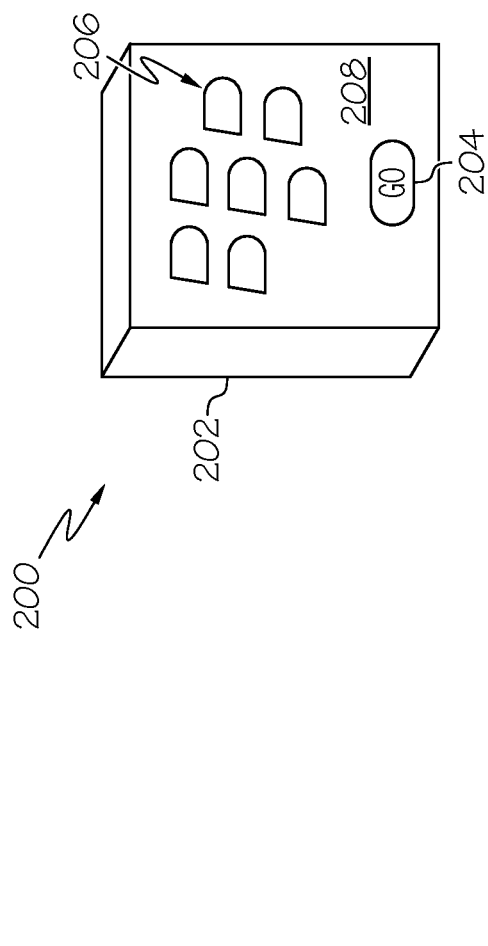
FIG. 2 illustrates an example logo arrangement of segments, according to an example.

FIG. 2 illustrates an example logo arrangement of segments 200, according to an example. As is common with many products, enclosures or cases of a product are able to have markings, such as a logo, that consists of several graphical segments. The markings, such as logos are usually large enough to allow easy recognition of the marking and be noticed by casual observers, but generally serve no functional purpose associated with device operations. Using the segments of a logo as an input to allow a user to enter a code, such as to support pairing or user authentication, advantageously reuses the space of used for the marking as a user input facility. As devices become smaller, the reuse of surface space in such a manner is even more beneficial. Smaller devices typically are not able to easily accommodate more complex user interface elements but benefit from the security afforded by more robust pairing code and/or user authentication data information that can be afforded by the pattern entry using marking segments that are described herein. These benefits are able to be realized while still allowing an easily seen marking, such as a company logo, to be prominently positioned on the case of the device.

The example logo arrangement of segments 200 depicts a device enclosure 202 with a front surface 208. An arrangement of segments 206, that includes seven segments arranged in the form of a company logo, is placed on a front surface 208 of the device enclosure 202. These segments are an example of a plurality of contact elements arranged on an external surface. In this example, the arrangement of segments 206 forms a logo that is commonly placed on products sold by BlackBerry, Inc. In addition to the arrangement of segments 206, the front surface 208 in this example is further shown to have an input button 204, with the word "GO" printed thereon, that can be used to start, end, or both start and end input of a pattern on the arrangement of segments 206. In further examples, such an input button used to start, end, or start and end a pattern input is able to be incorporated into other aspects of the enclosure or a similar input is able to be provided by different facilities. For example, other user provided inputs such as shaking the device enclosure 202 may be used to start, end, or stop and end entry of a pattern on the arrangement of segments 206. In some examples, expiration of a timeout after pressing a segment is able to be used in place of pressing the input button 204 for operations such as to end pattern input.

When the device enclosure 202 has a relatively small size, a company logo that is large enough to be noticed by casual observers may consume a large portion of the enclosure. Also, user input elements that allow entry of a code to authenticate a user or support device pairing may impair the aesthetics of the enclosure. The logo arrangement of segments 200 demonstrates the advantageous reuse of the logo on the device enclosure 202 to further support entry of a code, such as a user authentication code or pairing code.

Figure 3:
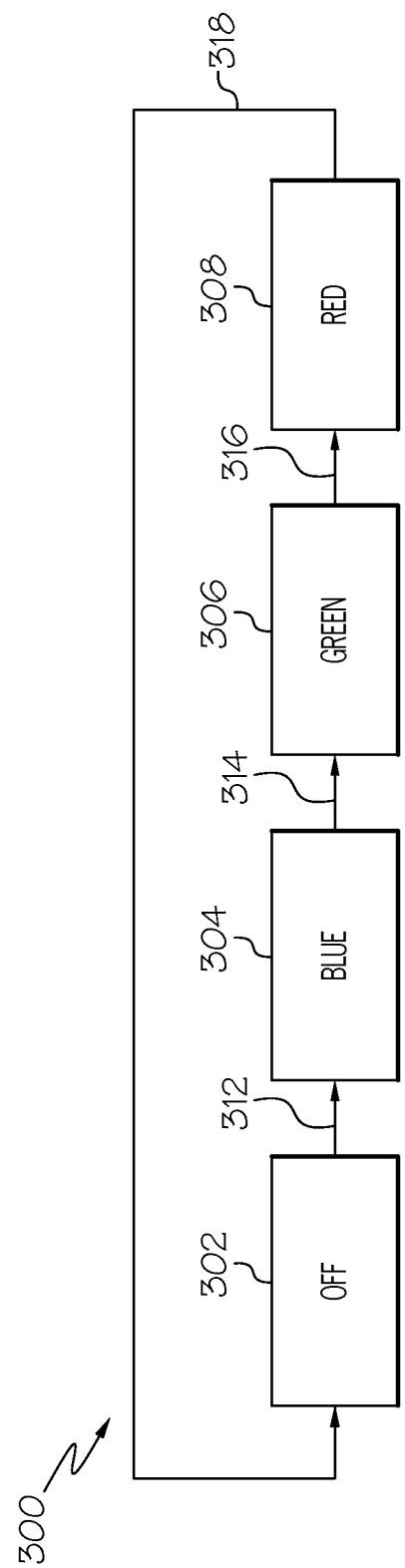
FIG. 3 illustrates an example light color sequence, according to an example.

FIG. 3 illustrates an example light color sequence 300, according to an example. The example light color sequence 300 depicts an example of a sequence of colors through which a backlight of a particular segment in an arrangement of segments, such as the arrangement of segments 122 described above, will cycle as the segment is pressed or touched. The illustrated sequence is an example and other examples may include fewer colors or more colors. In some examples, the colors of segments may not change according to a fixed sequence as the segment pressed or touched.

In the following description, the color of light emitted by a segment within an arrangement of segments is an example of a visual state of that segment. A visual state of a segment is able to be any visible characteristic of the segment and is not limited to the color of that segment.

In the illustrated example light color sequence 300, a backlight of a segment will start in an "off" visual state 302. When a segment is pressed or touched while in the "off" visual state 302, as indicated by a first transition 312, that segment changes to a "Blue" visual state 304. This proceeds as in an example with the segment changing, based on a touch or press indicated by a second transition 314, to a "green" visual state 306. A subsequent touch or press, indicated by a third transition 316, causes the segment to change to a "Red" visual state 308. Touching or pressing the segment in the "Red" visual state 308, as indicated by a fourth transition 318, causes the segment to return to the "Off" visual state 302. Further presses or touches in this example cause the sequence to repeat.

Figure 4:
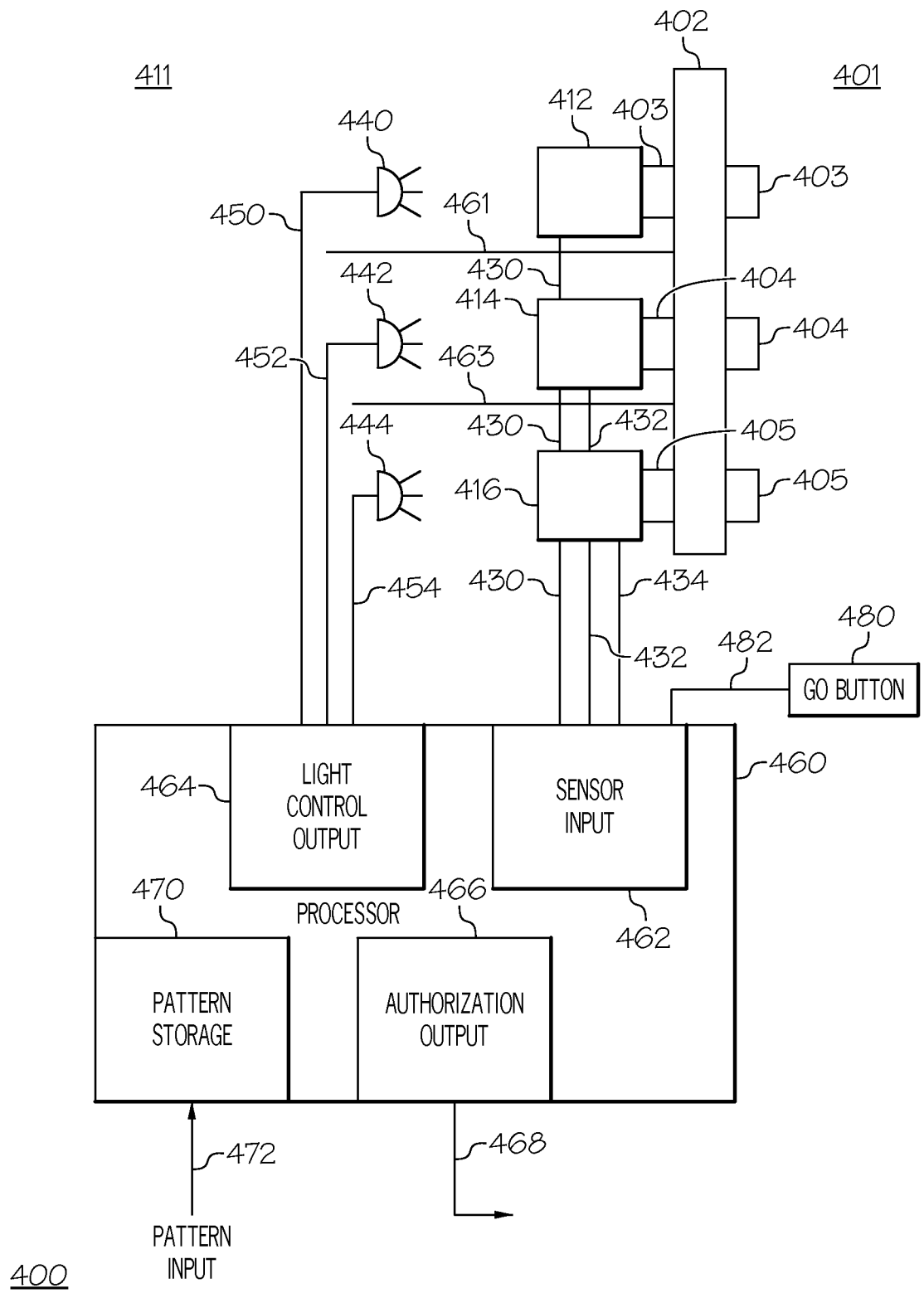
FIG. 4 illustrates a segment backlighting arrangement, according to an example.

FIG. 4 illustrates a segment backlighting arrangement 400, according to an example. The segment backlighting arrangement 400 depicts a cut-away, side view of an enclosure case 402 that has an arrangement of segments with switches, backlight elements, and control circuitry. These components are examples of a user code input device. The segment backlight arrangement 400 depicts a cut-away side view of an example of the front surface 208 of the device enclosure 202 as is discussed above. The outside 401 of the enclosure case is shown on the right side of the figure, and internal space 411 of the enclosure case 402 is shown on the left.

Three light conducting segment elements are shown to pass through the enclosure case 402 from the outside 401 to the internal space 411 of the enclosure case. In the illustrated segment backlighting arrangement 400, the segment elements are examples of contact elements that are able to be touched or pushed by a user. The portions of the segment elements depicted on the outside 401 of the enclosure case are examples of contact elements arranged on an external surface. A first segment element 403, a second segment element 404, and a third segment element 405 are shown to pass through the enclosure case 402. In an example, each segment element is able to move back and forth through a hole in the enclosure case 402 and is attached to a respective mechanical switch.

In the illustrated example, the first segment element 403 is attached to a first switch 412, the second segment element 404 is attached to a second switch 414, and the third segment element 405 is attached to a third switch 416. In this example, the tip of each segment element extending into the outside 401 of the enclosure case 402 is able to be pressed by a finger or other object and that segment element moves through the enclosure case 402 and closes a contact in its respective switch. The switches depicted in the segment backlighting arrangement 400 are examples of components that provide a respective output of respective contact elements that indicate a touch of that respective contact element by an external object, such as the depicted segment elements that are able to be touched or pressed by an object on the outside 401 of the enclosure case 402. In an example, the output of each switch is indicated by the conductive state across the switch, such as being either open or closed to conduct electrical current.

In an example with multiple segment elements arranged in a pattern such as a logo, as is depicted in the logo arrangement of segments 200 discussed above, a corresponding pattern of switches is able to be placed in the internal space 411 of the enclosure case 402 so that any segment element can be pressed and the switch contact closed. In further examples, other techniques are able to be used to detect a touching or a pressing of the various segment elements, such as capacitive coupling between a conductive portion of each segment element and an object near or touching the segment element, such as a user's finger. In further examples other mechanical arrangements are able to be used to create a suitable structure to perform the processes described below.

Each segment element also has a respective backlight element in this example. The first segment element 403 has a first backlight element 440, the second segment element 404 has a second backlight element 442, and the third segment element 405 has a third backlight element 444. In an example, each backlight element is configurable to emit light that is conveyed through one respective segment element but light from a particular backlight element is not conveyed through other segment elements. For example, light from the first backlight element 440 is conveyed through the first segment element 403, but not through any other segment element. In general, the construction of the respective switches and the arrangement of the backlight element, its respective segment element and switch are such that light passes through the switch and through to the segment element to be passed out to the outside 401 of the enclosure case 402.

In an example, light barriers are placed between the backlight elements and other components associated with of each segment element so that light does not pass between the backlight elements and associated respective segment elements. As shown, a first light barrier 461 is depicted between the components associated with the first segment element 403 and the second segment element 404. Similarly a second light barrier 463 is depicted between the components associated with the second segment element 404 and the third segment element 405.

In an example, each backlight element is a light emitter that may be configurable to emit light that has any color from within a number of determined colors. As is described above in association with the example color light sequence 300, each light element is an example of a light emitter that is able to independently emit light in any one of three determined colors, i.e., red, green, or blue, or be "off" in order to support four possible visual states. In various examples, the backlight elements are able to emit any suitable number of colors, intensities, or combinations of colors and intensities in order to support the pattern setting described herein. Segment elements with associated backlight elements that are configurable to emit different color light are an example of contact elements having a respective changeable visual state.

The segment backlighting arrangement 400 further depicts a processor 460 that is within an example electronic device. In various examples, the processor or its equivalent is able to be located in any suitable location. The processor 460 in this example has a sensor input 462 that has electrical separate electrical inputs connected to each switch associated with a segment element. A first electrical input connection 430 connects the first switch 412 to an input of the sensor input 462, a second electrical input connection 432 connects the second switch 414 to an input of the sensor input 462, and a third electrical input connection 434 connects the third switch 416 to an input of the sensor input 462. Based on signals received from the switches associated with each segment element, the processor 460 is able to determine when a user touches or presses each individual segment on the surface of the enclosure case 402.

The processor 460 further has a light control output 464 that has a separate control output that is electrically connected to each backlight element. The light control output has a first light control line 450 that is connected to the first backlight element 440, a second light control line 452 that is connected to the second backlight element 442, and a third light control line 454 that is connected to the third backlight element 444. The light control outputs 464 allow the processor 460 to control each backlight element of each segment element, to emit a color corresponding to the visual state of that segment element. In an example, the processor 460 determines when a segment element is touched or pressed, based on signals received through the sensor input 462, and changes the color of light emitted by the respective backlight element for that segment element through the signals produced by the light control output 464. The visual state of each segment is defined in one example by the color of light emitted by the backlight element associated with that element. In an example, the processor 460 controls and is able to determine the visual state of each segment based on the color indicated by the control signal provided to the backlight element associated with that segment.

The processor 460 further has a pattern storage 470 into which color patterns are able to be stored. As described herein, particular determined color patterns are able to be determined based on various techniques to support pairing devices or authenticating a user, and the user is able to touch or press segment elements to cause the segments to emit light in that determined pattern. Once it is determined that the user has set the segments to emit the particular color pattern, such as the color pattern stored in the pattern storage 470, the processor is able to activate an authorization output 468 to indicate proper authorization has been performed.

In some examples, the processor 460 includes various processing components. In one example, the processor 460 includes a visual state controller and an authentication controller. In one example, a visual state controller is coupled, such as via the sensor input 462, to the respective switch of each contact element, such as the above described first switch 412, second switch 414, and third switch 416. In an example, when the visual state controller is operating, it changes, based on receiving a respective indication from the respective contact element indicating a touching of the respective contact element, a respective visual state of the respective contact element. In an example, the respective visual states are changed via the light control output 464. The authorization controller in one example, when operating, authorizes, based on a determination that the respective visual states matches the determined pattern, access to an operation, such as via the authorization output.

Data stored in the pattern storage 470 is able to be obtained from any suitable source. In an example, a color pattern definition for a defined color pattern is able to be received by a pattern input 472 and derived from, for example, a mathematical operation on certificates used to support device pairing, a combination of certificates used to support device pairing in establishing a trusted communications connection, derived according to any suitable technique, or combinations of these. Further, a user is able to "set" a particular defined color pattern that the user is able to freely define and that is then stored into the pattern storage 470. The user is then able to later perform authentication in an example by setting that same pattern on the arrangement of segments and thereby "unlock" certain functions of the device.

The segment backlighting arrangement 400 further shows a "GO" button 480 which is able to be used in some examples. The examples illustrated in the above described device pairing environment 100 and in the example logo arrangement of segments 200 include such an input button, but further examples do not include this button. In further examples, a similar function is able to be performed by, for example, observing an expiration of a timeout period after the last segment pressing, shaking the device, or any other suitable technique. The "GO" button 480 in the illustrated example is connected to the sensor input 462 by a go button input 482. As is described below, the "GO" button is merely one example of an input that is able to be used as a special input trigger to cause, for example, a comparison of the light pattern set by a user on an arrangement of segments on the device to a defined pattern stored in, for example the pattern storage 470. Further examples do not include the "GO" button 480 and trigger comparisons or other similar processing based on other events, such as expirations of timeouts or other events.

Processes performed using the above described devices are described below with reference to the devices described above in the device pairing environment 100 and with reference to the components depicted in the segment backlighting arrangement 400. It is to be understood that such references are merely examples provided to more clearly understand the below descriptions and that similar processes are able to be performed in conjunction with any type of suitably configured devices.

Figure 5:
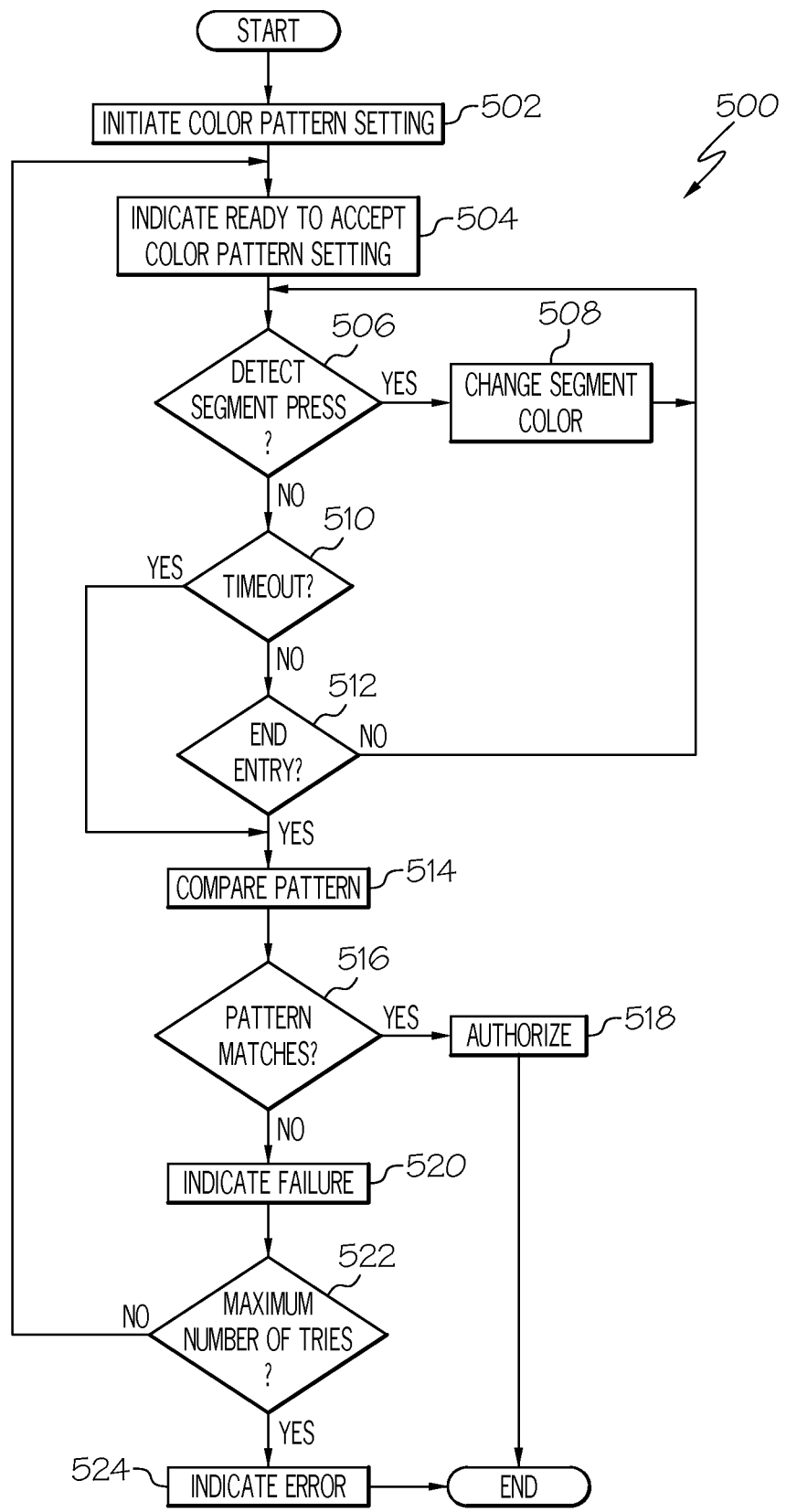
FIG. 5 illustrates a color pattern entry process, according to an example.

FIG. 5 illustrates a color pattern entry process 500, according to an example. The color pattern entry process 500 is an example of a method for user code entry that is performed by an electronic device, such as the electronic device 102, to allow a user to set a color pattern in order to, for example, support device pairing or to perform authentication. The following description refers to aspects of FIG. 1, the color pattern entry process 500 operates on the electronic device 102 to allow a user to set a color pattern on the arrangement of segments 122 according to a defined pattern, such as would be displayed on another device to support pairing or as was set by the user to support authentication. In an example, the processor 460 described above performs the color pattern entry process 500.

The color pattern entry process 500 begins by initiating the color pattern entry, at 502. Initiating a color pattern entry in one example is based on an input provided by the user. In an example, a user is able to begin the color pattern entry process by touching or pressing any one or more segments continually for at least two seconds when the arrangement of segments is not currently receiving inputs.

When a user indicates that the color pattern entry is to start, such as by pressing any segment in the arrangement of segments 122 for two seconds, the device indicates, at 504, that the arrangement of segments is ready to accept color pattern entry. In an example, this indication is provided by all of the segments being illuminated in a recognizable sequence, such as by blinking green color light for a few times or staying on for a few seconds.

After providing the indication that the device is ready to accept color pattern entry, a determination is made, at 506, if a segment has been pressed or touched. An example of this determination is described above with regards to the segment backlighting arrangement 400 where the processor 460 receives indications from the output of the switches associated with each segment element that indicates a touching, e.g., pressing, of the segment element.

If a segment has been pressed or touched, in one example the color of the segment is changed, at 508. Changing the color of the segment based on determining if the segment has been touched is an example of changing, based on receiving the respective indication, a respective visual state of the respective contact element. As discussed above, the segments in some examples are able to have visual states that are selectable colors within a plurality of determined colors and each element is able to be configured to display any one color within that plurality of determined colors. The color pattern entry process 500 then returns to detecting, at 506, if a segment has been pressed or touched.

Returning to detecting, at 506, if it is determined that a segment has not been pressed or touched, a determination is made, at 510, if a timeout has occurred. In general, a device only allows a certain amount of time to set a color pattern on the arrangement of segments. After that amount of time elapses, the arrangement of segments 122 generally does not accept further inputs for setting that color pattern. In some examples, a total time limit is set for setting the pattern after the indication that the device is ready to accept pattern entry, as is provided above at 504. In other examples, the time since the last pressing or touching of a segment is monitored and if too long of a time duration passes, a timeout is determined to occur. In further examples, a timeout is determined to occur based on a combination of total time since the start of pattern setting and the time since the last touch or press of a segment. In yet other examples, no timeout is monitored and the user is able to take as much time as desired to set a color pattern.

If a timeout is determined, at 510, to have occurred, the process in one example compares, at 514, the set pattern on the arrangement of segments to a determined pattern, as is described below. This comparison is an example of determining, based on receipt of indication of touching of the segments, i.e., contact elements, that the respective visual states of all contact elements match a determined pattern. In an example, the determined pattern includes a determined respective color of each respective contact element. If it is determined that a determination did not occur, a determination is made, at 512, if the user indicates that the setting of the color pattern has ended. In an example, the user indicates the end of the setting of the color pattern by pressing the "GO" input button 124 described above. If it is not determined that the setting of the color pattern has ended, the color pattern entry process 500 returns to detecting segment presses, at 506.

If the end of the segment pattern setting is determined to have occurred, at 512, the entered color pattern is compared, at 514, to a determined color pattern. In some examples, the determined color pattern is stored in a pattern storage 470 and is a pattern that was defined earlier by the user as a pattern to be used to authenticate the user. In further examples, the pattern is based on a mathematical operation on certificates exchanged by two devices to support pairing between the devices, a combination of certificates used to support device pairing in establishing a trusted communications connection, derived according to any suitable technique, or combinations of these. In some examples, the patterns are compared on a different device than the device with the arrangement of segments 122. In such examples, a description of the set color pattern is communicated to that different device and some or all of the below described processing is performed on that different device.

A determination is made, at 516, if the set color pattern matches the defined color pattern. If the patterns do match, the color pattern entry process 500 authorizes, at 518, an activity that is based on a proper entry of a correct color pattern. This authorization is an example of authorize, based on a determination that the respective visual states matches the determined pattern, access to an operation. In various examples, this authorization is able to authorize access to or performance of at least one function of a device, pairing of devices, or other actions, or combinations of these. The process then ends.

Returning to determining, at 516, if a match of the user entered color pattern and the defined color pattern is not determined, failure of the set color pattern to match the determined pattern is indicated, at 520. Such an indication may be provided by, for example, blinking all segments red for a few times. After failure is indicated, a determination is made, at 522, if the maximum number of tries has occurred. In some examples, the number of attempts to enter a code is limited to a few tries, and then the device stops accepting inputs to change the colors of segments. If the maximum number of tries is not determined to have occurred, the color pattern entry process 500 returns to indicating the device is ready to accept setting of a color pattern, at 504. In this example, any previous colors set on the segments are lost and the segments return to their initial state.

If the maximum number of tries is determined to have occurred, at 522, the color pattern entry process 500 indicates, at 524, that an error occurred. In an example, this error is indicated by blinking all of the segments red for a longer period of time than the time they are blinked to indicate failure, at 520. The color pattern entry process 500 then ends.

Figure 6:
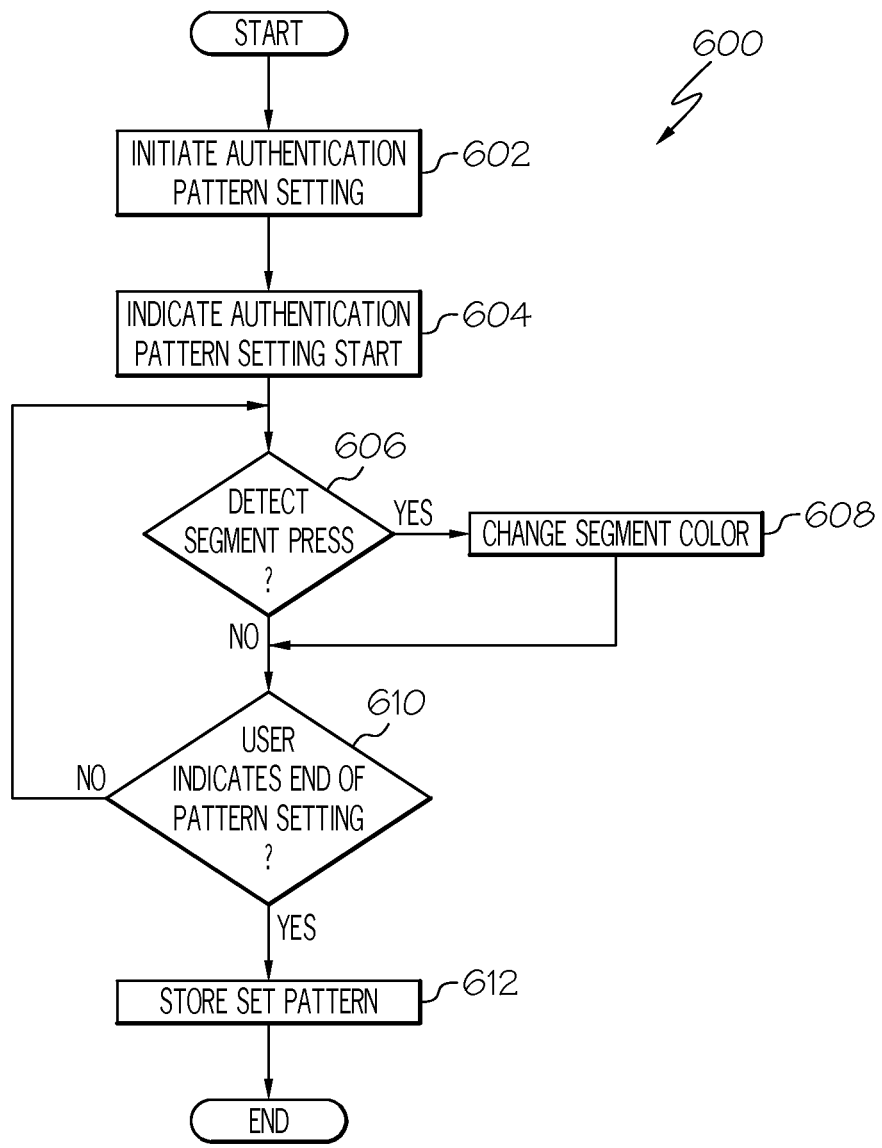
FIG. 6 illustrates an authentication color pattern entry process, according to an example.

FIG. 6 illustrates an authentication color pattern entry process 600, according to an example. The authentication color pattern entry process 600 is an example of a process that allows a user to set a particular color pattern on an arrangement of segments 122 so that the same pattern is able to be set on the arrangement of segments 122 at a later time to authenticate the user and, for example, control access to functions on a device. Thus, in an example, the authentication color pattern entry process 600 is performed prior to the color pattern entry process 500.

The authentication color pattern entry process 600 is initiated, at 602. The authentication color pattern entry process 600 is able to be initiated in various examples by any suitable technique. In one example, touching or pressing a particular segment in the arrangement of segments 122 for a particular time duration causes the authentication color pattern entry process 600 to be initiated. The authentication color pattern entry process 600 may also be initiated by an input received through other input facilities available on or for the electronic device 102, such as by a command received from a remote device over a communications link. In some examples, the authentication color pattern entry process is performed prior to starting the color pattern entry process 500 described above. Such initiating of the authentication color pattern entry process 600 is an example of starting, prior to receipt of the respective indication from the respective output of each respective contact element indicating a touching of the respective contact element, an authentication pattern setting input.

Once the authentication color pattern entry process 600 is initiated, the authentication color pattern entry process 600 indicates, at 604, the start of authentication pattern setting. The start of authentication pattern setting in one example is indicated by the continuously illuminating or blinking some or all of the segments in the arrangement of segments 122 a particular color for a particular amount of time.

The authentication color pattern entry process 600 continues by detecting, at 606, a touching or pressing of a segment in the arrangement of segments 122. Detecting this touching or pressing is an example of receiving, based on the start of the authentication pattern setting input, respective indications from the respective outputs of each respective contact element indicating a touching of the respective contact element.

If a segment is determined to have been pressed or touched, the color of the light for that segment is changed, at 608. Changing the color of the light for a segment is an example of changing, based on a receipt of the respective indication, a respective visual state associated with the respective contact element. In an example, the color changes according to the example light color sequence 300.

If it is determined, at 606, that a segment was not touched or pressed, or after the segment's color is changed, at 608, a determination is made as to whether the user, at 610, indicates the end of color pattern setting. In various examples an end of color pattern setting is able to be indicted by pressing a particular segment for an extended period of time, or by pressing a particular button, such as the input button 124, after setting a desired color pattern on the arrangement of segments 122. If the end of color pattern setting is not indicated, the authentication color pattern entry process 600 returns to detecting, at 606, a pressing or touching of a segment.

If the user indicates, at 610, the end of the color pattern setting, a definition of the color pattern set on the arrangement of segments 122 is stored, at 612. In an example, the definition of the set color pattern is able to be stored in the color pattern storage 470 as is described above. In further examples, the definition of the set color pattern is able to be stored in any suitable structure, either within the electronic device 102 or communicated to other devices for remote storage that is able to be communicated to the electronic device 102 for future authentication. Storing of the color pattern set on the arrangement of segments 122 in this context is an example of storing, into the pattern storage, based on the change of the respective visual state, the determined pattern, the determined pattern corresponding to the respective visual state associated with each respective contact element in the plurality of contact elements. The authentication color pattern entry process 600 then end.

Figure 7:
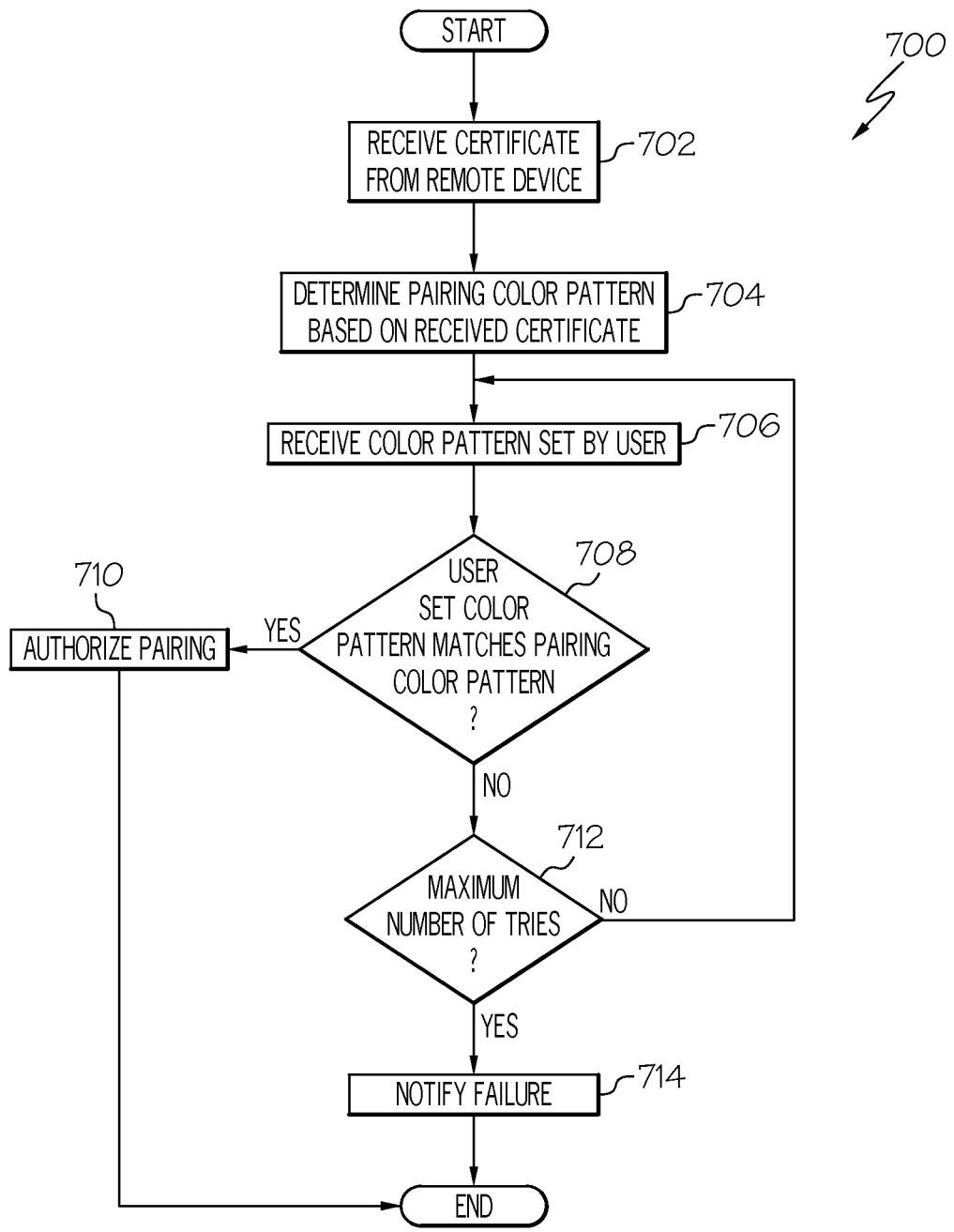
FIG. 7 illustrates a paring pattern input authorization process, according to an example.

FIG. 7 illustrates a paring pattern input authorization process 700, according to an example. The paring pattern input authorization process 700 is an example of a process performed on an electronic device 102 to support pairing with a remote device to establish a trusted communications channel. The pairing supported by the paring pattern input authorization process 700 includes any suitable type of pairing of two or more devices. Examples of pairing supported by the paring pattern input authorization process 700 include pairing performed by devices communicating over a Bluetooth™ communications link, or via BlackBerry® Blend™.

The paring pattern input authorization process 700 begins in one example by receiving, at 702, a certificate from a remote device. In general, pairing between devices is based upon cryptographic certificates exchanged between devices. In further examples, pairing is able to be performed based on other information, based only on the information entered by the user as is described below, or on combinations of these, and no certificates are exchanged between the devices.

The paring pattern input authorization process 700 in this example continues by determining a pairing color pattern based on the received certificates, at 704. The pairing color pattern in some examples is a determined color pattern to which a user set color pattern is compared, as is described above. The pairing color pattern in some examples are able to be determined by any suitable technique based on the values determined based upon mathematical operations on or combinations of the received certificate and a local certificate on the device performing the paring pattern input authorization process 700.

The paring pattern input authorization process 700 continues by receiving, at 706, a color pattern set by the user. The color pattern is able to be set in an example with a process similar to that described above for the color pattern entry process 500.

The paring pattern input authorization process 700 determines, at 708, if the received color pattern set by the user matches a pairing color pattern, such as the pairing color pattern determined above, at 704. If the color pattern set by the user is determined to match the pairing color pattern, pairing is authorized, at 710. In some examples, authorizing pairing involves sending a particular data set to the remote device with which pairing is being performed in order to complete the pairing process. The paring pattern input authorization process 700 then ends.

Returning to the determination at 708, if it is determined, at 708, that the color pattern set by the user does not match the pairing color pattern, a determination is made, at 712, if the user has attempted to set the color pattern for a maximum number of tries. If the maximum number of tries is not determined to have occurred, the paring pattern input authorization process 700 returns to receiving, at 706, a color pattern set by the user.

If the maximum number of tries is determined to have occurred, failure to pair the devices is notified to the user, at 714. In an example, failure is indicated by continuously illuminating or blinking the segments in the arrangement of segments 122 a particular color for an amount of time. Further processing may also be performed to impede or hinder unauthorized pairing attempts, as are known by practitioners of ordinary skill in the relevant arts. The paring pattern input authorization process 700 then ends.

Figure 8:
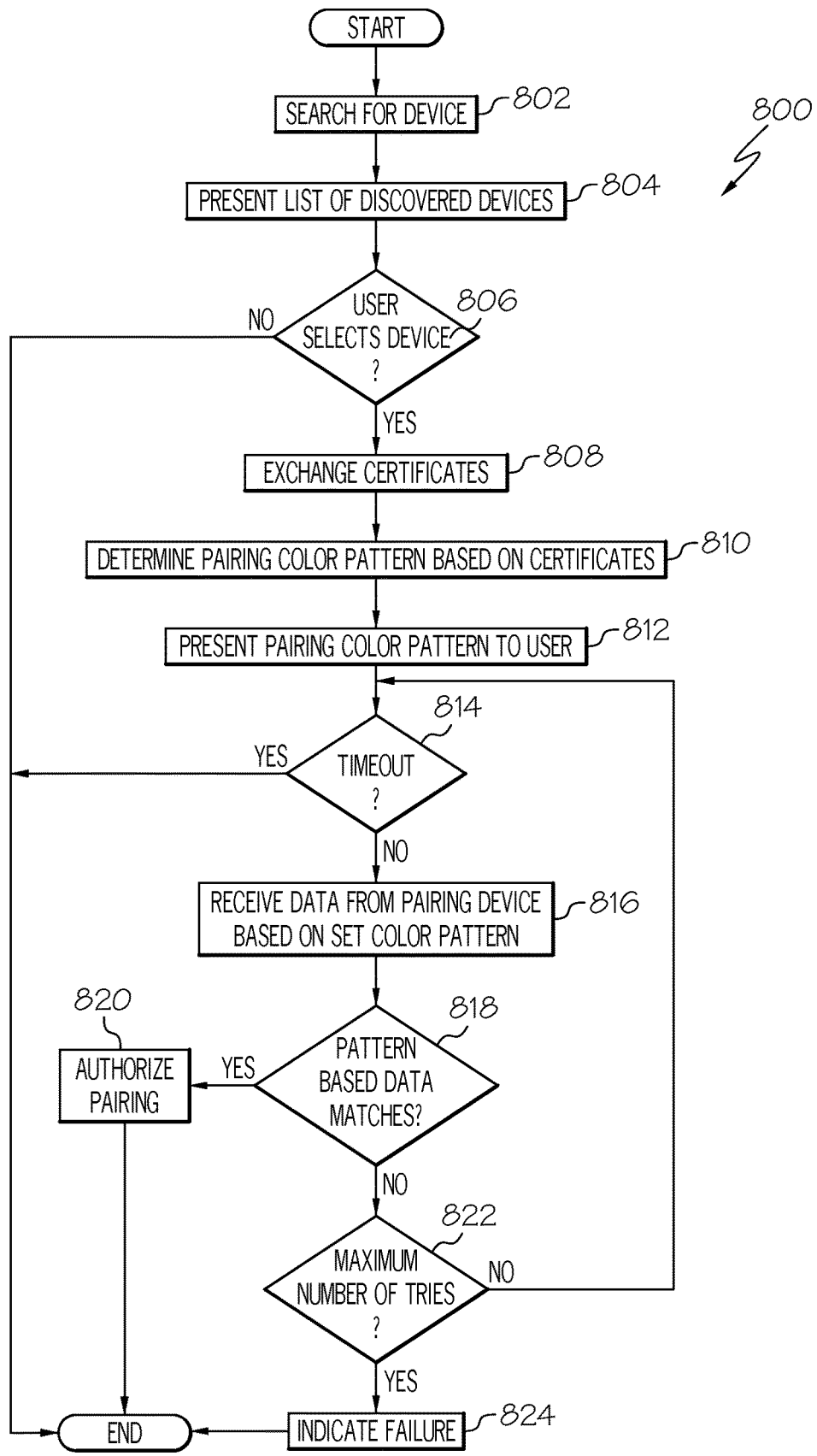
FIG. 8 illustrates device pairing process, according to an example.

FIG. 8 illustrates device pairing process 800, according to an example. The device pairing process 800 is a process performed by a remote device, such as the tablet computing device 104, computer 106, or smartphone 108 described above, when performing pairing with a device such as the electronic device 102. In general, the device pairing process 800 is performed on a device with user input and output facilities that allow the presentation of a color pattern that the user is to set on the device to be paired with. The device pairing process 800 in this example includes processing to determine and present to a user a color pattern to be set on the electronic device 102 to complete pairing between the devices.

The device pairing process 800 beings by searching for devices available for paring, at 802. Referring to the device pairing environment 100, in an example the tablet computing device 104 is performing the device pairing process 800 and thus perform the search. In the example illustrated in the device pairing environment 100, the electronic device 102 is a device that is discovered in this search and is thus available for pairing. Searching for devices available for pairing is generally a process defined by a communications standard and identifies nearby devices that have the ability to pair with other devices.

After searching for devices, the device pairing process 800 presents, at 804, a list of discovered devices. A user is then able to select a device from this presented list. A determination is made, at 806, if the user selected a device to pair with. This determination is able to be made by any suitable technique. If it is determined that the user does not select a device to pair with, the device pairing process 800 ends.

In the example described with the device paring environment 100, a user of one or more of the tablet computing device 104, computer 106, or smartphone 108, selects to pair with the electronic device 102. If it is determined, at 806, that the user selected a device, such as the electronic device 102, the device pairing process 800 continues in one example to exchange certificates with the selected device, at 808. As discussed above, some pairing operations do not exchange certificates or base pairing on different criteria, data, or combinations of this.

The device pairing process 800 determines, at 810, a color pattern based on the certificates. In an example, this is similar to the pairing color pattern determined in the paring pattern input authorization process 700. Determining this color pattern is an example of determining a color pattern for an arrangement of segments, the color pattern defining a respective color for each segment in the arrangement of segments. This determination is further an example of determining a color pattern based on a mathematical operation on the certificates used to support device pairing, a combination of certificates used to support device pairing in establishing a trusted communications connection, derived according to any suitable technique, or combinations of these.

The determined pairing color pattern is then presented, at 812, to the user. Referring to the scenario depicted for the device pairing environment 100, the tablet computing device 104 presents the determined color pattern and the user sets that same color pattern on the segments within the arrangement of segments 122. Presenting the determined color pattern is an example of displaying a representation of the arrangement of segments, wherein each segment in the representation has the respective color defined by the color pattern.

After the pairing color pattern is presented to the user, some examples allow the user to complete the pairing process on the other device within a defined time duration. If that time duration elapses without successful pairing, a timeout is determined to occur. If a timeout is determined, at 814, to have occurred, the device pairing process 800 in one example ends.

If a timeout is determined, at 814, to not have occurred, data is received, at 816, from the paring device based on the color pattern. In general, any data used to support authentication in the pairing operation is able to be received, as is understood by practitioners of ordinary skill in the relevant arts in light of the present discussion. Receiving this data is an example of receiving, from a remote device, data indicating a second color pattern set on an arrangement of segments associated with the remote device.

A determination is made, at 818, if the set color pattern based data matches expected data for the pairing operation, such as is determined based on exchanged certificates or other criteria. If it is determined that the set color pattern based data matches the expected data, pairing is authorized, at 820. This conditioned authorization is an example of based on a comparison of the data and the color pattern, authorizing pairing with the remote device.

If it is determined that the set color pattern based data does not match the expected data, a determination is made, at 822, if a maximum number of tries has occurred. If it is determined that the maximum number of tries has not occurred, the device pairing process 800 allows the user to set another color pattern on the pairing device. In some examples, a determination that there have not been the maximum number of tries results in returning to determining, at 814, if a timeout occurs for receiving data from the pairing device. If it is determined that the maximum number of tries has occurred, a notification of a failure to successfully pair with the pairing device is provided, at 824, and the process ends.

Figure 9:
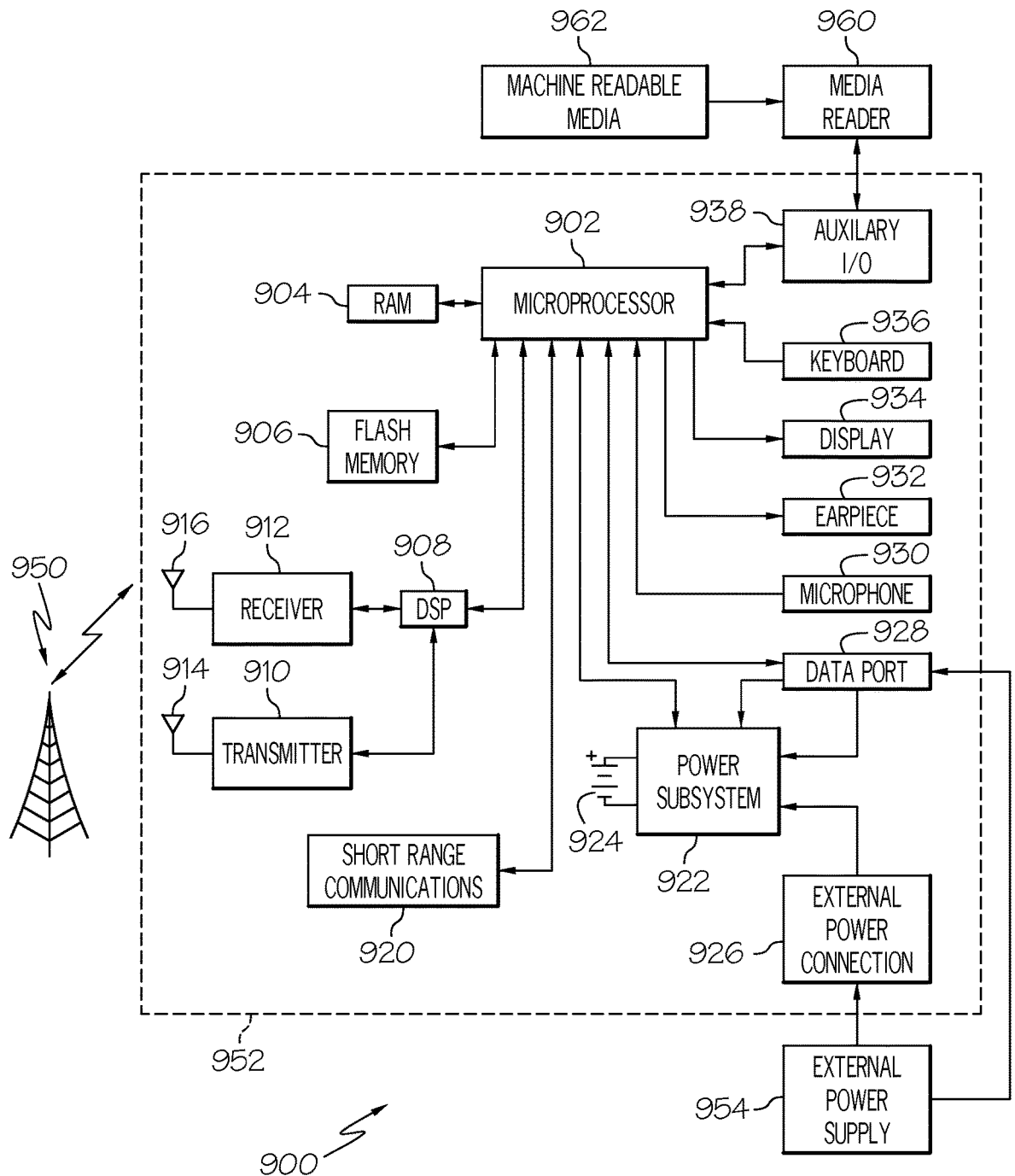
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. In various examples, the electronic device 952 is able to be an example of the above described electronic device 102, which does not have a conventional user interface including, for example, a display or input facilities comparable to a keyboard, or the electronic device 952 is alternatively able to be a wireless two-way communication device with voice, text chat, and data communication capabilities, such as the above described tablet computing device 104, computer 106, smartphone 108, similar such devices, or any other suitable device that includes various user interface facilities. Such electronic devices communicate with a wireless voice, text chat, or data network 950 using a suitable wireless communications protocol. Wireless voice communications are performed using either an analog or digital wireless communication channel. Data communications allow the electronic device 952 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 952 is an example electronic device that includes two-way wireless communications functions. Such electronic devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communications protocols with which the device is intended to operate.

The electronic device 952 includes a microprocessor 902 that controls the overall operation of the electronic device 952. The microprocessor 902 interacts with the above described communications subsystem elements and also interacts with other device subsystems. In various examples, the electronic device 952 is able to include one or more of various components such as flash memory 906, random access memory (RAM) 904, auxiliary input/output (I/O) device 938, data port 928, display 934, keyboard 936, earpiece 932, audio sound reproduction system 970, microphone 930, a short-range communications subsystem 920, a power subsystem 922, other subsystems, or combinations of these.

One or more power storage or supply elements, such as a battery 924, are connected to a power subsystem 922 to provide power to the circuits of the electronic device 952. The power subsystem 922 includes power distribution circuitry for providing power to the electronic device 952 and also contains battery charging circuitry to manage recharging the battery 924 (or circuitry to replenish power to another power storage element). The power subsystem 922 receives electrical power from external power supply 954. The power subsystem 922 is able to be connected to the external power supply 954 through a dedicated external power connector (not shown) or through power connections within the data port 928. The power subsystem 922 includes a battery monitoring circuit that is operable to provide a status of one or more battery status indicators, such as remaining capacity, temperature, voltage, electrical current consumption, and the like, to various components of the electronic device 952.

The data port 928 is able to support data communications between the electronic device 952 and other devices through various modes of data communications, such as high speed data transfers over an optical communications circuits. Data port 928 is able to support communications with, for example, an external computer or other device. In some examples, the data port 928 is able to include electrical power connections to provide externally provided electrical power to the electronic device 952, deliver electrical power from the electronic device 952 to other externally connected devices, or both. Data port 928 of, for example, an electronic accessory is able to provide power to an electronic circuit, such as microprocessor 902, and support exchanging data between the microprocessor 902 and a remote electronic device that is connected through the data port 928.

Data communication through data port 928 enables a user to set preferences through the external device or through a software application and extends the capabilities of the device by enabling information or software exchange through direct connections between the electronic device 952 and external data sources rather than via a wireless data communication network. In addition to data communication, the data port 928 provides power to the power subsystem 922 to charge the battery 924 or to supply power to the electronic circuits, such as microprocessor 902, of the electronic device 952.

Operating system software used by the microprocessor 902 is stored in flash memory 906. Further examples are able to use a battery backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904. The microprocessor 902 in some examples includes a component, such as is able to be defined in flash memory 906 in one example, that is a pattern creator that when operating, determines a color pattern for an arrangement of segments, the color pattern defining a respective color for each segment in the arrangement of segments. In one example, the display 934 when operating displays a representation of the arrangement of segments, wherein each segment in the representation has the respective color defined by the color pattern as determined by the pattern creator.

The microprocessor 902, in addition to its operating system functions, is able to execute software applications on the electronic device 952. A set of applications that control basic device operations, including at least data and voice communication applications, is able to be installed on the electronic device 952 during manufacture. In an example, programs and other data used to support the processes described above are able to be installed in the memory of the electronic device 952. Further examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 952 through, for example, the wireless network 950, an auxiliary I/O device 938, Data port 928, short-range communications subsystem 920, or any combination of these interfaces. Such applications are then able to be installed by a user in the RAM 904 or a non-volatile store for execution by the microprocessor 902.

In a data communication mode, a received signal such as a text message or web page download is processed by the communication subsystem, including wireless receiver 912 and wireless transmitter 910, and communicated data is provided the microprocessor 902, which is able to further process the received data. In some examples, the electronic device 952 includes a display, output ports, or combinations of these. In such example, the received data is able to be processed for output to the display 934, or alternatively, to an auxiliary I/O device 938 or the Data port 928. In examples of the electronic device 952 that include a keyboard 936 or other similar input facilities, a user of the electronic device 952 may also compose data items, such as e-mail messages, using the keyboard 936, which is able to include a complete alphanumeric keyboard or a telephone-type keypad, in conjunction with the display 934 and possibly an auxiliary I/O device 938. Such composed items are then able to be transmitted over a communication network through the communication subsystem.

For voice communications, overall operation of the electronic device 952 is substantially similar, except that received signals are generally provided to an earpiece 932 and signals for transmission are generally produced by a microphone 930. Alternative voice or audio I/O subsystems, such as a voice message recording subsystem, may also be implemented on the electronic device 952. Although voice or audio signal output is generally accomplished primarily through the earpiece 932, in examples of electronic devices 952 that include a display 934, the display 934 may also be used to provide an indication of the identity of a calling party, the duration of a voice call, or other voice call related information, for example.

Depending on conditions or statuses of the electronic device 952, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 920 provides for data communication between the electronic device 952 and different systems or devices, which need not necessarily be similar devices. For example, the short-range communications subsystem 920 includes an infrared device and associated circuits and components or a Radio Frequency based communication module such as one supporting Bluetooth® communications, to provide for communication with similarly-enabled systems and devices, including the data file transfer communications described above. In one example, the short-range communications subsystem 920 includes a receiver that when operating receives, from a remote device, data indicating a second color pattern set on an arrangement of segments associated with the remote device, and, based on a comparison of the data and the color pattern as defined by the pattern creator within the microprocessor 902 in one example, authorizes pairing with the remote device.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the electronic device through the Data port 928 or computer readable program code is alternatively able to be provided to the electronic device 952 through the wireless network 950.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A user code input device, comprising:
a plurality of contact elements arranged on an external surface, the plurality of contact elements comprising a first contact element and a second contact element,
each respective contact element providing a respective output indicating a touch of the respective contact element by an external object, and
each respective contact element having a respective changeable visual state, the respective changeable visual state being based upon a respective electrical control input of the respective contact element;
a visual state controller, coupled to each contact element in the plurality of contact elements, that when operating, changes via the respective electrical control input of the first contact element, based on receiving respective indications from the first contact element indicating a respective sequence of a plurality of touches of the first contact element, a respective visual state of the first contact element to a respective subsequent visual state, the respective subsequent visual state being based on a respective number of touches in the respective sequence of the plurality of touches of the first contact element;
a display that when operating displays a representation of an arrangement of segments, wherein each segment in the representation has a respective color defined by a determined color pattern; and
an authorization controller that, when operating:
determines a color pattern for the arrangement of segments, the color pattern defining a respective color for each segment in the arrangement of segments, wherein the determined color pattern comprises the color pattern,
receives, from a remote device comprising the plurality of contact elements, data indicating a second color pattern set on an arrangement of a plurality of segments associated with the remote device,
wherein the second color pattern set on the arrangement of the plurality of segments on the remote device is set based upon a color set on each segment in the plurality of segments on the remote device, wherein each segment in the plurality of segments on the remote device is set to a color based on a respective number of touches on that segment; and
authorizes, based on a determination that the respective subsequent visual states match the determined color pattern, access to an operation, wherein the determination that the respective visual states of the plurality of contact elements match the determined color pattern is based on a comparison of the data and the determined color pattern.

2. The user code input device of claim 1,
wherein the respective changeable visual state comprises selectable colors within at least three determined colors,
wherein each contact element within the plurality of contact elements is further configured to selectably display any one color within the at least three determined colors, and
wherein the determined color pattern comprises a determined respective color of each respective contact element within the plurality of contact elements.

3. The user code input device of claim 2, wherein each respective backlight element is configurable to emit any color within the at least three determined colors, and
wherein the visual state controller when operating further controls the respective backlight element of each respective contact element via its respective electrical control input to emit a color corresponding to a respective visual state of the respective contact element.

4. The user code input device of claim 1, wherein the operation comprises performing at least one function on a device.

5. The user code input device of claim 1, further comprising a pattern storage communicatively coupled to the authorization controller, and wherein the authorization controller when operating further:
starts, prior to receipt of respective indications from the respective output of each respective contact element indicating a touching of the respective contact element, an authentication pattern setting input;
receives, based on a start of the authentication pattern setting input, the respective indications from the respective outputs of each respective contact element indicating a respective number of touches of the respective contact element;

changes, via the respective electrical control input of the respective contact element and based on a receipt of the respective indications from the respective outputs of each respective contact element, a respective visual state associated with the respective contact element; and stores into the pattern storage, based on the change of the respective visual state, a determined pattern, the determined pattern corresponding to the respective visual state associated with each respective contact element in the plurality of contact elements, and further determines that the respective visual states of the plurality of contact elements match the determined pattern by comparison to the determined pattern retrieved from the pattern storage.

6. The user code input device of claim 1, the authorization controller when operating further:

receives a digital certificate from a remote device; and determines, based on data contained within the digital certificate, the determined color pattern.

7. The user code input device of claim 1, wherein the visual state controller, when operating, further changes via the respective electrical control input of the second contact element, based on receiving respective indications from the second contact element indicating a respective sequence of a plurality of touches of the second contact element, a respective visual state of the second contact element to a respective subsequent visual state, the respective subsequent visual state being based on a respective number of touches in the respective sequence of the plurality of touches of the second contact element.

8. The user code input device of claim 1, wherein each respective contact element comprises a mechanical switch, and wherein indicating the touch of the respective contact element is based on operating the mechanical switch by depressing the respective segment element associated with the respective contact element.

9. The user code input device of claim 1, further comprising a case comprising the external surface, wherein each respective segment element passes from an interior of the case through the external surface to an exterior of the case, wherein each respective backlight element is within the interior of the case, and wherein each respective segment element conveys light to the exterior of the case from the respective backlight element of the respective contact element coupled to the respective segment element.

10. The user code input device of claim 1, further comprising a plurality of segment elements, each respective segment element being separate from other segment elements in the plurality of segment elements and each respective segment element protruding from a first side of an external surface through a respective passage of the external surface to a second side of the external surface opposite the first side of the external surface, where each respective passage is separate from other passages through which other segment elements protrude, where each respective contact element is coupled to a respective segment element, where the respective output indicates a touch of the respective segment element to which the respective contact element is coupled, where each respective contact element comprises a respective backlight element producing the respective changeable visual state in the respective segment element to which the respective contact element is coupled.

11. A method for user code entry, comprising:

determining a color pattern for an arrangement of segments, the color pattern defining a respective color for each segment in the arrangement of segments, wherein a determined pattern comprises the color pattern;

receiving an electronic definition of the color pattern for the arrangement of segments;

displaying a representation of the color pattern for the arrangement of segments, wherein each segment in the representation has the respective color defined by the color pattern;

receiving a respective indication from a respective output of each respective contact element within a plurality of contact elements, the plurality of contact elements comprising a first contact element and a second contact element, the respective output indicating a respective number of touches within a respective sequence of a plurality of touches of the respective contact element;

changing, based on receiving the respective indication and based upon the respective number of touches, a respective visual state of the first contact element to a respective subsequent visual state, the respective subsequent visual state being based on a respective number of touches in the respective sequence of the plurality of touches of the first contact element, the respective visual state being based upon a respective electrical control input of the first contact element;

receiving, from a remote device comprising the respective contact element, data indicating a second color pattern set on an arrangement of a plurality of segments associated with the remote device, wherein the second color pattern set on the arrangement of the plurality of segments on the remote device is set based upon a color set on each segment in the plurality of segments on the remote device, wherein each segment in the plurality of segments on the remote device is set to a color based on a respective number of touches on that segment;

determining, based on receipt of the respective indication and based on a comparing the data and the color pattern, that the respective subsequent visual states of all contact elements match a determined pattern; and authorizing, based on a determination that the respective subsequent visual states of the plurality of contact elements match the determined pattern, access to an operation.

12. The method of claim 11, wherein changing the respective visual state comprises controlling the respective contact element, via the respective electrical control input, to emit a selectable color within at least three determined colors, and wherein the determined pattern comprises a determined respective color emitted by each respective contact element within the plurality of contact elements.

13. The method of claim 11, wherein the operation comprises performing at least one function on a device.

14. The method of claim 11, further comprising starting, prior to receiving respective indications from the respective output of each respective contact element indicating a touching of the respective contact element, an authentication pattern setting input;

receiving, based on starting the authentication pattern setting input, the respective indications from the respective outputs of each respective contact element indicating a touching of the respective contact element;

changing, via the respective electrical control input of the respective contact element and based on receiving the respective indications from the respective outputs of each respective contact element, a respective visual state associated with the respective contact element; and storing in to a pattern storage, based on changes of the respective visual state of all contact elements, the determined pattern, the determined pattern corresponding to the respective visual state associated with each respective contact element in the plurality of contact elements, and wherein determining that the respective visual states of the plurality of contact elements match the determined pattern comprises comparison to the determined pattern retrieved from the pattern storage.

15. The method of claim 11, further comprising:
receiving a digital certificate from a remote device; and
determining, based on data contained within the digital certificate, the determined pattern.

16. The method of claim 11, wherein the color pattern is determined at least in part based on data contained within cryptographic digital certificates associated with the pairing.

17. A device that pairs with a remote device, the device comprising:
a pattern creator that when operating determines a color pattern for an arrangement of segments, the color pattern defining a respective color for each segment in the arrangement of segments;
a display that, when operating,
receives an electronic definition of the color pattern for the arrangement of segments; and
displays a representation of the color pattern for the arrangement of segments, wherein each segment in the representation has the respective color defined by the color pattern; and
a receiver that when operating receives, from a remote device, data indicating a second color pattern set on an arrangement of a plurality of segments associated with the remote device,
wherein the second color pattern set on the arrangement of the plurality of segments on the remote device is set based upon a color set on each segment in the plurality of segments on the remote device, wherein each segment in the plurality of segments on the remote device is set to a color based on a respective number of touches on that segment, and,
based on a comparison of the data and the color pattern, authorizes pairing with the remote device.

18. A non-transitory computer readable storage medium having computer readable program code embodied therewith, the computer readable program code comprising instructions executable by a processor to:
determine a color pattern for an arrangement of segments, the color pattern defining a respective color for each segment in the arrangement of segments, wherein a determined pattern comprises the color pattern;
receive an electronic definition of the color pattern for the arrangement of segments;
display a representation of the color pattern for the arrangement of segments, wherein each segment in the representation has the respective color defined by the color pattern;
receive a respective indication from a respective output of each respective contact element within a plurality of contact elements, the plurality of contact elements comprising a first contact element and a second contact element, the respective output indicating a respective number of touches within a respective sequence of a plurality of touches of the respective contact element;
change, based on receiving the respective indication and based upon the respective number of touches, a respective visual state of the first contact element to a respective subsequent visual state, the respective subsequent visual state being based on a respective number of touches in the respective sequence of the plurality of touches of the first contact element, the respective visual state being based upon a respective electrical control input of the first contact element;
receive, from a remote device comprising the respective contact element, data indicating a second color pattern set on an arrangement of a plurality of segments associated with the remote device,
wherein the second color pattern set on the arrangement of the plurality of segments on the remote device is set based upon a color set on each segment in the plurality of segments on the remote device, wherein each segment in the plurality of segments on the remote device is set to a color based on a respective number of touches on that segment;
determine, based on receipt of the respective indication and based on a comparison of the data and the color pattern, that the respective subsequent visual states of all contact elements match a determined pattern; and
authorize, based on a determination that the respective subsequent visual states of the plurality of contact elements match the determined pattern, access to an operation comprising pairing with the remote device.

19. The non-transitory computer readable storage medium of claim 18,
where each respective contact element coupled to a respective segment element within a plurality of segment elements, with each respective segment element being separate from other segment elements in the plurality of segment elements and each respective segment element protruding from a first side of an external surface through a respective passage of the external surface to a second side of the external surface opposite the first side of the external surface, where each respective passage is separate from other passages through which other segment elements protrude.

* * * * *